US008599797B2

(12) United States Patent
Pelkonen (10) Patent No.: US 8,599,797 B2
(45) Date of Patent: Dec. 3, 2013

(54) APPARATUS AND METHOD FOR TRANSFERRING PDP CONTEXT INFORMATION FOR A TERMINAL IN THE CASE OF INTERSYSTEM HANDOVER

(75) Inventor: Mari-Jaana Pelkonen, Espoo (FI)

(73) Assignee: Nokia Corporation, Espoo (FI)

( * ) Notice: Subject to any disclaimer, the term of this patent is extended or adjusted under 35 U.S.C. 154(b) by 932 days.

(21) Appl. No.: 11/812,264

(22) Filed: Jun. 15, 2007

(65) Prior Publication Data

US 2008/0025263 A1 Jan. 31, 2008

Related U.S. Application Data

(60) Provisional application No. 60/814,057, filed on Jun. 16, 2006.

(51) Int. Cl.
*H04B 1/26* (2006.01)

(52) U.S. Cl.
USPC ........... 370/332; 370/328; 370/329; 370/330; 370/331; 370/333; 370/334

(58) Field of Classification Search
USPC .......................... 370/332, 328–331, 333, 334
See application file for complete search history.

(56) References Cited

U.S. PATENT DOCUMENTS

| 6,301,479 | B1* | 10/2001 | Roobol et al. ................. 455/436 |
| 6,725,039 | B1 | 4/2004 | Parmar et al. |
| 2002/0142749 | A1* | 10/2002 | Muniere et al. ............... 455/403 |
| 2002/0160785 | A1 | 10/2002 | Ovesjo et al. |
| 2003/0114158 | A1* | 6/2003 | Soderbacka et al. .......... 455/436 |
| 2003/0119452 | A1* | 6/2003 | Kim et al. ....................... 455/69 |
| 2004/0147262 | A1* | 7/2004 | Lescuyer et al. ............... 455/434 |
| 2005/0152275 | A1* | 7/2005 | Laurila et al. .................. 370/241 |
| 2006/0172738 | A1* | 8/2006 | Kwon et al. .................... 455/439 |
| 2006/0234709 | A1* | 10/2006 | Marinescu et al. ............ 455/436 |

(Continued)

FOREIGN PATENT DOCUMENTS

| EP | 1 331 832 A2 | 7/2003 |
| WO | WO 02080604 A1 | 10/2002 |

(Continued)

OTHER PUBLICATIONS

3GPP TR 23.882 draftV1.2.0 (May 2006) "3rd Generation Partnership Project; Technical Specification Group Services and System Aspects; 3GPP System Architecture Evolution: Report on Technical Options and Conclusions (Release 7)" herein 3GPP.*

(Continued)

*Primary Examiner* — Lester Kincaid
*Assistant Examiner* — Mehmood B Khan
(74) *Attorney, Agent, or Firm* — Mintz, Levin, Cohn, Ferris, Glovsky and Popeo, P.C.

(57) ABSTRACT

A method of handing over of a mobile terminal from a first network to a second network. The method includes initiating a handover decision in a base station, sending a handover request to a MME, mapping, in the MME, between active SAE Bearers and required PDP contexts, and sending a handover preparation request including target network specific QoS information from the MME to the second network. The method further includes sending a handover confirmation message that includes RAB success and failure information from the second network to the MME, and sending a handover command from the MME to the mobile terminal, wherein the handover command includes a 3G/2G RAB, a channel, an SEC, and PDP context information.

27 Claims, 5 Drawing Sheets

(56) References Cited

U.S. PATENT DOCUMENTS

| | | | |
|---|---|---|---|
| 2006/0239229 A1* | 10/2006 | Marinescu et al. | 370/331 |
| 2006/0262723 A1* | 11/2006 | Velev et al. | 370/235 |
| 2007/0021120 A1* | 1/2007 | Flore et al. | 455/436 |
| 2007/0153742 A1* | 7/2007 | Sebire et al. | 370/331 |
| 2007/0213060 A1* | 9/2007 | Shaheen | 455/436 |
| 2007/0232301 A1* | 10/2007 | Kueh | 455/433 |
| 2007/0248064 A1* | 10/2007 | Shaheen | 370/338 |
| 2007/0253359 A1* | 11/2007 | Hall et al. | 370/328 |
| 2007/0258427 A1* | 11/2007 | Shaheen et al. | 370/338 |
| 2007/0280177 A1* | 12/2007 | Uusikartano et al. | 370/338 |
| 2007/0281697 A1* | 12/2007 | Davis | 455/436 |
| 2008/0013553 A1* | 1/2008 | Shaheen | 370/401 |
| 2008/0039090 A1* | 2/2008 | Jin et al. | 455/436 |
| 2008/0096571 A1* | 4/2008 | Pedersen et al. | 455/450 |
| 2008/0167054 A1* | 7/2008 | Shaheen | 455/458 |
| 2008/0304450 A1* | 12/2008 | Rexhepi et al. | 370/331 |
| 2009/0067628 A1* | 3/2009 | Pudney et al. | 380/247 |
| 2009/0111458 A1* | 4/2009 | Fox et al. | 455/422.1 |

FOREIGN PATENT DOCUMENTS

| | | | | |
|---|---|---|---|---|
| WO | WO 2005/125256 | * | 12/2005 | H04Q 7/38 |
| WO | WO 2005/125256 A1 | | 12/2005 | |
| WO | WO-2006037386 A1 | | 4/2006 | |

OTHER PUBLICATIONS

3GPP TR 23.882 draft V1.2.0 (May 2006) "3rd Generation Partnership Project; Technical Specification Group Services and System Aspects; 3GPP System Architecture Evolution: Report on Technical Options and Conclusions (Release 7)".*

3 GPP TR 23.882 V1.2.3, "*3rd Generation Partnership Project; Technical Specification Group Services and System Aspects; 3 GPP System Architecture Evolution: Report on Technical Options and Conclusions (Release 7)*", Jun. 2006, pp. 121.

3GPP TSG SA WG2 Architecture—S2#50, "*MME, UPE and Inter-AS Anchor in the Evolved Architecture*", S2-060133, Jan. 2005, pp. 1-4.

Joint 3GPP TSG SA WG2/TSG RAN WG2/TSG RAN WG3, "*Bearer Service Model for QoS Signalling*", SRJ-060035, Feb. 2006, pp. 1-3.

3GPP TSG RAN WG3 Meeting #51 bis, "*SAE Bearer Service Architecture and QoS Model*", R#-060461, Apr. 2006, pp. 1-4.

International Search Report PCT/IB2007/001607 filed Jun. 15, 2007.

* cited by examiner

APPARATUS AND METHOD FOR TRANSFERRING PDP CONTEXT INFORMATION FOR A TERMINAL IN THE CASE OF INTERSYSTEM HANDOVER

CROSS-REFERENCES TO RELATED APPLICATIONS

This application claims priority of U.S. Provisional Patent Application Ser. No. 60/814,057, filed on Jun. 16, 2006. The subject matter of the above referenced application is incorporated by reference.

BACKGROUND OF THE INVENTION

1. Field of the Invention

The present invention relates to a system and method of performing network handover procedures for mobile communication devices, and in particular, to performing network handover procedures in between second and third generation network systems.

2. Description of the Related Art

Mobile communication has progressed substantially in the past 15 years. Communication protocols, configurations, and capabilities have advanced from first generation analog voice-only cellular systems, through second generation (2G) voice and data digital cellular systems, to third generation (3G) wide-band digital cellular systems. Currently, a third generation system called Long Term Evolution/System Architecture Evolution (LTE/SAE) is being developed, and a fourth generation wide-band network system is expected to be implemented in the future. Although most of the third generation communications devices are backward compatible with second and first generation systems, handover issues still present challenges. For example, handover of a device from a 3G LTE/SAE network, previously termed 3.9G in some corporate settings, to a third generation-second generation (3G/2G) network presents several challenges for the devices and control protocols.

Enabling seamless roaming between the various networks can only be achieved through standards and business agreements involving network operators and the vendors of wireless networking solutions. In furtherance of this objective, several alliances made up of representatives from various industry experts and executives have been established. One such alliance is the Unlicensed Mobile Alliance (UMA), which has developed technology that puts Global System for Mobile communications (GSM) traffic into IP packets, thereby enabling access to 2G and 2.5G services over unlicensed spectrum technologies, such as Wi-Fi communications networks. This allows subscribers to roam and perform handover between cellular networks and public and private unlicensed wireless networks using UMA-compliant, dual-mode devices. Another alliance is a $3^{rd}$ Generation Partnership Project (3GPP)—a global corporative project in which standardization bodies coordinate Wideband Code Division Multiple Access (WCDMA) issues. 3GPP represents the most advanced wide area network solution that mobile operators can deploy.

In 2G/3G networks, a terminal is responsible of requesting quality of service (QoS) during initiation of packet data protocol (PDP) context. PDP context in a logical association between a mobile station and a public data network running across a General Packet Radio Service (GPSR) network, as defined by 3GPP. The context defines aspects such as routing, QoS, Security and Billing. QoS request is set at the application level according to the need of a particular service. As a response to the requested QoS, the terminal is given the negotiated QoS when the PDP context establishment is complete. Therefore, the terminal is aware of the actual QoS reservation in the network at the application layer. Because the terminal is heavily responsible for QoS negotiation, the capabilities of the terminal restrict the available QoS. Hence, the network can offer only the requested level of QoS, even if the requested level of QoS is not optimal for the particular service. This is a problem, which should be avoided in the LTE networks. Therefore, it is required that decisions relating to QoS in LTE networks are to be made by the network and not the terminal.

Therefore, given the progression of communication network protocols and systems and their limited geographical implementation, along with the presence of multiple network-type user terminals, there is a need for a handover method that allows for efficient and reliable handover from emerging technology network user terminals (LTE/SAE and 4G network-type user terminals) to existing network user terminals (3G/2G user terminals).

SUMMARY OF THE INVENTION

An embodiment of the present invention is directed to a method including receiving, by a source mobility management entity, a handover initiation request for handover from a first network to a second network and performing mapping between packet data protocol context and bearers. The packet data protocol context is used in a second generation/third generation network and the bearers are SAE bearers The method also includes sending a handover preparation request including the second network quality of service information from the source mobility management entity to a target serving support node for further transmission to the second network and setting up radio access bearers according to the handover preparation request. The method further includes receiving a handover preparation confirm message at the source mobility management entity for indicating that a handover preparation phase is complete and sending a handover command to a user equipment, the handover command including the second network information, such that when a connection is established between the user equipment and the second network, the user equipment is able to map ongoing services to correct packet data protocol contexts.

Another embodiment of the invention is directed to a source mobility management entity a receiving unit configured to receive a handover initiation request for handover from a first network to a second network and configured to map between packet data protocol context and bearers. The source mobility management entity also includes a sending unit configured to send a handover preparation request including the second network quality of service information from the source mobility management entity to a target serving support node for further transmission to the second network, wherein radio access bearers are set up according to the handover preparation request. The source mobility management further includes a receiving unit configured to receive a handover preparation confirm message at the source mobility management entity for indicating that a handover preparation phase is complete and a sending unit configured to send a handover command to a user equipment, the handover command including the second network information, such that when a connection is established between the user equipment and the second network, the user equipment is able to map ongoing services to correct packet data protocol contexts.

Another embodiment of the invention is directed to an apparatus including receiving unit for receiving a handover initiation request for handover from a first network to a second network and performing means for performing and mapping between packet data protocol context and bearers, wherein the packet data protocol context is used in a second generation/third generation network and the bearers are SAE bearers. The apparatus also includes sending means for sending a handover preparation request including the second network quality of service information from the source mobility management entity to a target serving support node for further transmission to the second network and setting means for setting up radio access bearers according to the handover preparation request. The apparatus also includes receiving means for receiving a handover preparation confirm message at the source mobility management entity for indicating that a handover preparation phase is complete and sending means for sending a handover command to a user equipment, the handover command including the second network information, such that when a connection is established between the user equipment and the second network, the user equipment is able to map ongoing services to correct packet data protocol contexts.

Another embodiment of the invention is directed to a mobile terminal including a unit configured to receive a handover command from a source mobility management entity, wherein the handover command includes a second generation/third generation network radio access bearer, channel, an SEC, and packet data protocol context information. The mobile terminal also includes a releasing unit configured to release a connection to a second generation/third generation network access system. When a connection to the second generation/third generation radio access network is established, the mobile terminal is configured to map an ongoing service into an appropriate packet data protocol context.

Another embodiment of the invention is directed to a system including a sending unit, in an evolved radio access network, configured to send a handover initiation request for handover from a first network to a second network. The system also includes a receiving unit, in a source mobility management entity, configured to receive the handover initiation request for handover from the first network to the second network and a performing unit, in the source mobility management entity, configured to map between packet data protocol context and bearers. The packet data protocol context is used in a second generation/third generation network and the bearers are system architecture evolution bearers. The system further includes a sending unit, in the source mobility management entity, configured to send a handover preparation request including the second network quality of service information to a target serving support node for further transmission to the second network and a setting unit configured to set up radio access bearers according to the handover preparation request. The system also includes a sending unit, in the second network access, configured to send a handover confirmation message to the source mobility management entity for indicating that a handover preparation phase is complete. The system also includes a sending unit, in the source mobility management entity, configured to send a handover command to a user equipment, the handover command including the second network information, such that when a connection is established between the user equipment and the second network, the user equipment is able to map ongoing services to correct packet data protocol contexts.

It should be noted that the methods and apparatus described in the present application are not limited to being utilized for SAE to 2G/3G handover, but could be used in other intersystem handovers.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
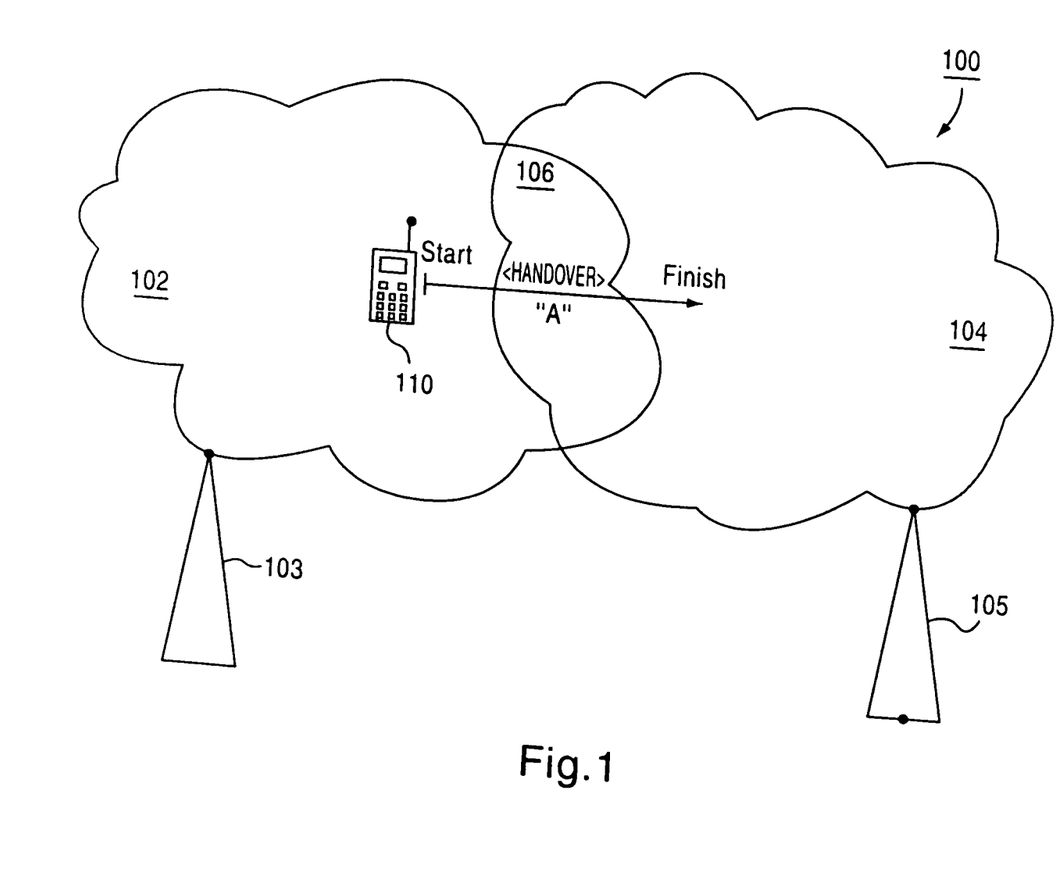
FIG. 1 illustrates a cellular communication system configuration where a LTE/SAE handover to a 3G/2G system of the invention may be implemented.

FIG. 1 illustrates a cellular communication system configuration 100 where a handover from SAE/LTE to a 3G/2G system as provided in embodiments of the invention may be implemented. The communication system 100 may include a first network coverage area 102 that is supplied by a first radio tower 103 and a second coverage area 104 that is supplied by a second radio tower 105. The coverage areas of the respective towers 103 and 105 may overlap in a third coverage area 106. The first coverage area 102 may, for example, be a LTE-type of coverage area, and the second coverage area 104 may, for example, be a 3G/2G-type coverage area.

In operation, a mobile terminal 110 may be operating in coverage area 102 under a SAE/LTE network; however, the mobile terminal 110 may be traveling in a geographic direction that will eventually take mobile terminal 110 out of the coverage area 102 of tower 103, as illustrated by the arrow "A" in FIG. 1. Additionally, the direction of arrow "A" may allow for mobile terminal 110 to travel into coverage area 104. In this situation, mobile terminal 110 must transition between communications with tower 103 in coverage area 102 to tower 105 in coverage area 104, i.e., mobile terminal 110 must handover from the SAE/LTE service of tower 103 to the 3G/2G service of tower 105. The handover process is conventionally conducted in the dual coverage area 106, where mobile terminal 110 is in a communication zone for both towers 103 and 105, although a terminal is generally only able to use one 3GPP radio access at a time, that is, the terminal is able to send a first message to a target base station only when the connection to the old base station is terminated. However, embodiments of the present invention provide a handover method where mobile terminal 110 receives PDP context handover information when terminal 110 enters the SAE/LTE coverage areas, i.e., in area 106 or 102.

In order to facilitate the handover process from LTE/SAE network 102 to 3G/2G network 104, embodiments of the invention provide a handover method for terminal 110 to transition. More particularly, embodiments of the invention provide a handover command message that is used to transfer PDP context information to the user equipment/mobile terminal 110. In embodiments of the present invention, the PDP context is generally not created in mobile terminal 110 while the mobile terminal remains attached to SAE/LTE network 102. Receiving 3G/2G network 104 assumes that the mobile terminal has the PDP context information when the mobile terminal acquires 3G/2G radio channels. Thus, from receiving 3G/2G access network 104 point of view, there is little, if any, difference if the handover was originated from another 3G/2G base station or LTE access system. The PDP context information used in embodiments of the present invention is a new information type, which informs mobile terminal 110 about active PDP contexts related to 3G/2G radio channels, but does not trigger any PDP context activation signaling. The PDP context information type includes the relevant parts of the mobile station mobile management (MM) and PDP Context.

The PDP context information generally includes a data structure present on both the Serving GPSR Support Node (SGSN) and the Gateway GPSR Support Node (GGSN) that includes the subscribing mobile terminal's session information when the subscriber has an active session with a particular network. GGSNs and SGSNs are collectively known as GSNs. GGSN acts as an interface between the GPRS backbone network and the external packet data networks, such as radio networks and the IP networks. It converts the GPRS packets coming from the SGSN into the appropriate PDP format and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN is responsible for IP address assignment and is the default router for the connected user equipment). The GGSN also performs authentication and charging functions.

SGSN is responsible for the delivery of data packets from and to mobile stations within its geographical service area. Its tasks include packet routing and transfer, mobility management (attach/detach and location management), logical link management, and authentication and charging functions. The location register of the SGSN stores location information, for example, current cell, current visitor location register and user profiles such as the IMSI, address(es) used in the packet data network of all GPRS users registered with the SGSN.

When a mobile terminal wants to use GPRS, it must first attach and then activate a PDP context with the network. This operates to allocate a PDP context data structure in the SGSN that the subscriber is currently visiting and the GGSN serving the subscribers access point. The data recorded may generally include the subscriber's IP address, the subscriber's IMSI, the subscriber's tunnel ID (TEID) at the GGSN, and the subscribers tunnel ID (TEID) at the SGSN. The TEID is a number allocated by the GSN which identifies the tunneled data related to a particular PDP context.

GPRS tunneling protocol is generally the defining IP protocol of GPRS core network. This is the protocol that allows end users of a GSM or UMTS network to move from place to place while maintaining data communication as if from one location at the GGSN. It does this by carrying the subscriber's data from the subscriber's current SGSN to the GGSN that is handling the subscriber's session. There are generally three forms of GPRS Tunneling Protocols (GTP) that are used by GPRS core networks. GTP-U is used for transferring of user data in separated tunnels for each PDP context. GTP-C is used for control reasons including, setup and deletion of PDP contexts, verification of GSN reachability, and updates, for example as subscribers move from one SGSN to another. GTP' is used for transferring charging data from GSNs to the charging function. GGSNs and SGSNs listen for GTP-C and GTP-U messages on specific UDP ports. This communication generally occurs within a single network. The charging gateway function (CGF) listens to GTP' messages sent from the GSNs on a specific UDP port. The core network sends charging information to the CGF, typically including PDP context activation times and the quantity of data which the end user has transferred. In SAE/LTE, the SAE Access Bearer is assumed to be based on evolved GTP-U protocol.

One challenge with conventional handover methodologies is that the handover command message is usually only a trigger, even though it includes radio access bearer (RAB) and security information, for performing the handover. In embodiments of the present invention, it is possible to include more data in the handover over message. In addition, in embodiments of the present invention, there is no channel for informing whether nor not the message was successfully processed, that is, there are no acknowledge (ACK) messages that must be sent. Therefore, the methodology of the present invention allows for no additional signaling to transfer information to the terminal in the handover situation.

Figure 2:
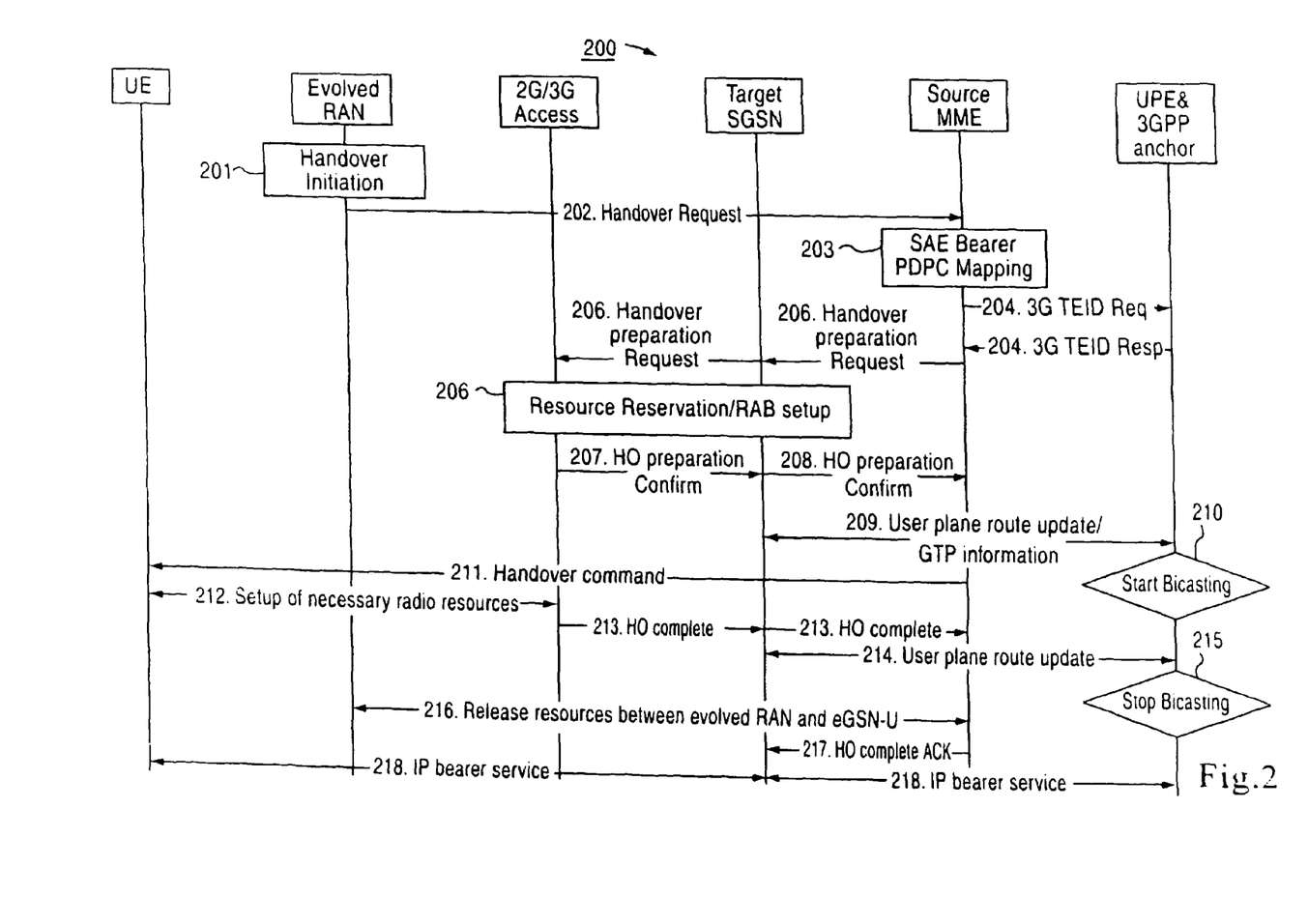
FIG. 2 illustrates a flowchart of an exemplary handover method of the invention.

FIG. 2 illustrates a flowchart of an exemplary handover method of the invention. A User Plane Entity (UPE) in the FIG. 2 represents a view of a combined LTE anchor and 3GPP anchor. The 3GPP anchor includes functionalities the GGSN. In the current implementations, the evolved core network is divided to three boxes: a combined mobility management entity (MME) and UPE, a 3GPP anchor, and a non-3GPP anchor. In an architecture where an embodiment of the invention may be implemented, the MME and UPE are separated and UPE could be co-located with 3GPP anchor. Intersystem handover is time critical event. To reduce the handover latency, the target network should be as ready for the handover if possible before the connection to the source network is released. Therefore, the appropriate resources for the active services that the terminal is consuming, should be established in the target network during a handover preparation phase. The method illustrated in FIG. 2 describes how not only the primary PDP context, but all required PDP contexts are created in the target network during the handover preparation phase, so that the services may continue in the terminal as smoothly as possible after the handover.

Figure 4:
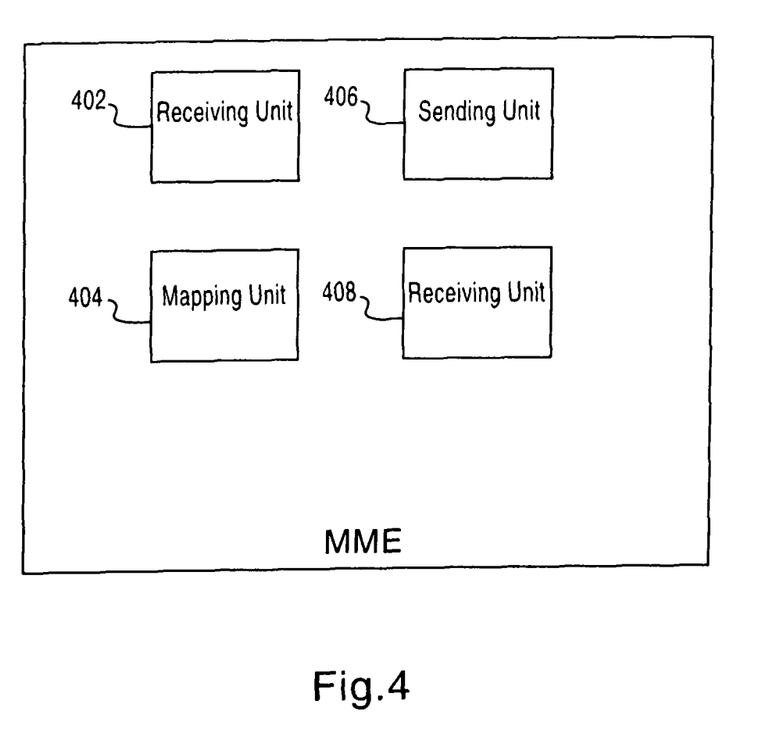
FIG. 4 illustrates components of a mobility management entity.

The exemplary method begins at step 201, where an evolved node B (eNB) in the source RAN makes handover initiation decision. The method then continues to step 202, where the eNB sends the handover request to a receiving unit 402, including the target cell id, to the source MME, as illustrated in FIG. 4. At step 203, the Source MME notices that the target base station is in a 3G/2G access system and performs mapping, by a mapping unit 404, between SAE Bearers and PDP contexts. This step is generally referred to as the SAE Bearer→PDPC mapping step of the handover process, as illustrated in FIG. 2. The mapping between SAE Bearer and PDP context may not be one-to-one. Instead, the mapping depends on the mapping of QoS parameters in SAE and in 3G/2G, the terminal capabilities and the user profile. The mapping would result in one primary PDP context and 0-n secondary PDP contexts, depending on the used services.

At step 204, when the mapping is ready, the Source MME requires GTP-U TEIDs for needed GTP-U tunnels from the UPE (3GPP anchor). This is required only if the number of GTP tunnels is different between LTE and 3G/2G or the MME needs to indicate a different QoS for new access. Note that the UPE does not terminate the usage of TEIDs allocated for SAE Bearers. Instead, UPE only decides if it should allocate totally new TEIDs for requested PDP contexts, or reuse the existing TEIDs in the 3G/2G access. If the number of requested PDP context exceeds the number of SAE Bearers, new TEIDs have to be created/reserved. If the number of requested PDP context is less than the number of active SAE Bearers, the UPE has to decide, which of the TEIDs to reuse in the new access network and which should be released after the step 232 User plane route update.

At step 205, a handover preparation request that includes 3G/2G specific QoS information and required PDP contexts (no LTE specific information included) is sent from, a sending unit 406, in the Source MME to the Target SGSN and further to the 2G/3G access. At step 206, RABs are set up according to the handover preparation request. Specifically, the SGSN sends the handover preparation request on to the 2G/3G access network, and the RABs are set up according to the handover preparation request, that is according to the requested PDP contexts. The method then continues to step 207, where a handover preparation confirm message that includes information of successfully and unsuccessfully created RABs, negotiated QoS, that is, activated PDP contexts, is sent to the source MME and received by unit 408. The handover preparation request confirmation indicates to the source system, that the handover preparation phase is completed. The negotiated QoS (activated PDP contexts) is included in this message.

Figure 5:
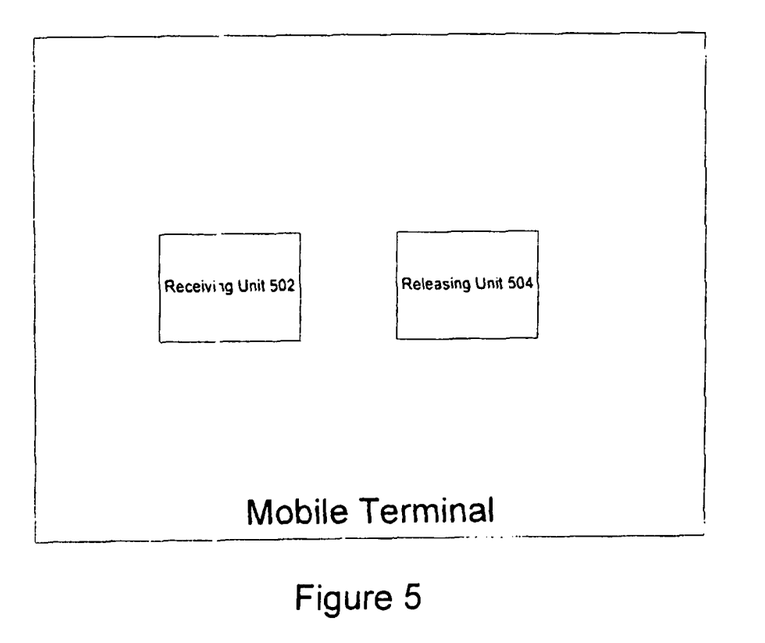
FIG. 5 illustrates the components of a mobile terminal used in embodiments of the invention.

At step 209 of the exemplary method, the user plane between UPE (3GPP anchor) and SGSN is updated for bi-casting purposes and the GTP-U tunnel TEID in SGSN is sent to the UPE. The U-plane resource reservation is ready and bi-casting can take place at step 210. At step 211, the handover command sent to the user equipment (UE) includes the 3G/2G RAB, channel, SEC, and PDP context information. The handover command is received by a receiving unit 502, as shown in FIG. 5. After this step the terminal releases the connection to LTE access system. The terminal includes a releasing unit 504 for releasing the connection, as shown in FIG. 5. As soon as the connection to 3G/2G radio access network is established, the terminal is able to map the ongoing services into the right PDP contexts. At step 212, after the connection to LTE access system is released, channels between UE and 2G/3G radio access network are established. Due to the pre-activated PDP contexts and the PDP context info transferred to the UE, the terminal is immediately able to map the right services into right radio bearers (PDP contexts). It should be noted that all of the units illustrated in FIG. 4 may be included in one or more components, as is known to one skilled in the art.

With the channels established, the method continues to step 213, where the radio interface is properly configured, the target access system informs target SGSN that the handover has been successfully completed, and the SGSN forwards the information to the source MME. At step 214, the SGSN updates the user plane route with UPE (3GPP anchor). This message informs UPE that the old route via LTE is no longer in use. At step 215, the UPE stops bi-casting data and at step 216, after handover confirmation arrives at source MME, the resources in the source access network are released. The method then continues to step 217, where the MME acknowledges the handover complete-message to SGSN when the resources have been released. At step 218, no messaging takes place, but the new user plane connection via target access system is active.

Figure 3:
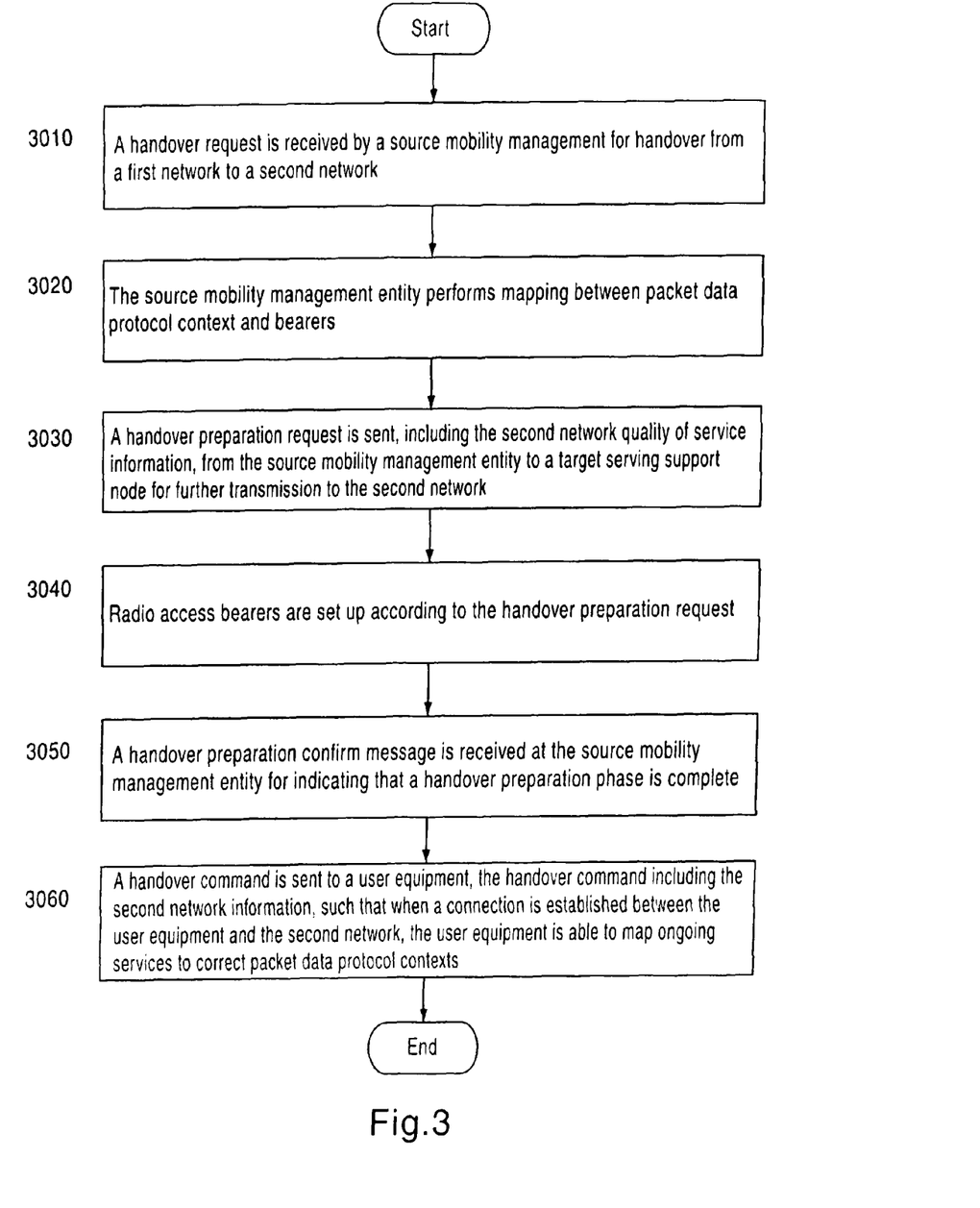
FIG. 3 illustrates the steps implemented in embodiments of the invention.

FIG. 3 illustrates the steps implemented in embodiments of the invention. In Step 3010, a handover initiation request is received by a source mobility management for handover from a first network to a second network. In Step 3020, the source mobility management entity performs mapping between packet data protocol context and bearers. The packet data protocol context is used in second generation/third generation network and the bearers are the SAE bearers. In Step 3030, a handover preparation request is sent, including the second network quality of service information, from the source mobility management entity to a target serving support node for further transmission to the second network. In Step 3040, radio access bearers are set up according to the handover preparation request. In Step 3050, a handover preparation confirm message is received at the source mobility management entity for indicating that a handover preparation phase is complete. In Step 3060, a handover command is sent to a user equipment, the handover command including the second network information, such that when a connection is established between the user equipment and the second network, the user equipment is able to map ongoing services to correct packet data protocol contexts.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed:

1. A method, comprising:
    receiving, by a source mobility management entity, a handover initiation request for handover from a first network to a second network;
    performing, by the source mobility management entity, a one-to-one mapping between one or more packet data protocol contexts and one or more bearers;
    sending a handover preparation request including a second network quality of service information from the source mobility management entity to a target serving support node for further transmission to the second network;
    receiving a handover preparation confirm message at the source mobility management entity for indicating that a handover preparation phase is complete; and
    sending, by the source mobility management entity, a handover command to a user equipment, the handover command including a second network information, wherein the second network information includes radio access bearer information, wherein when a connection is established between the user equipment and the second network, the user equipment is able to map ongoing services to correct one or more packet data protocol contexts.

2. The method according to claim 1, further comprising:
    receiving information, from the second network, by the source mobility management entity, that handover is successful;
    updating a user plane route with a user plane entity; and
    releasing resources, in a source access network, after the handover preparation confirm message is received by the source mobility management entity.

3. The method according to claim 1, further comprising including a negotiated quality of service in the handover preparation confirm message.

4. The method according to claim 1, wherein receiving a handover initiation requests comprises:
    upon a determination, by a network entity, that a handover is required from the first network to the second network, receiving the handover initiation request at the source mobility management entity.

5. The method according to claim 1, wherein the one-to-one mapping between the one or more packet data protocol contexts and the one or more bearers depends on at least one of a mapping of quality of service parameters in the first network and in the second network, one or more terminal capabilities, and a user profile.

6. The method according to claim 1, wherein the source mobility management entity is separated from a user plane entity and wherein the user plane entity is co-located with a third generation anchor.

7. The method according to claim 6, wherein the source mobility management entity requires subscriber tunnel identifiers for a tunneling protocol from the user plane entity, if the number of tunnels is different between the first network and the second network or if the source mobility management entity is to indicate a quality of service for a new access.

8. The method according to claim 7, further comprising updating a user plane route between the user plane entity and the target serving support node for bi-casting purposes and sending the tunnel identifiers for a tunneling protocol from the target serving support node to the user plane entity.

9. The method according to claim 1, wherein the second network is a second/third generation network and the first network is a long term evolution network.

10. A method according to claim 1, wherein the performing of the one-to-one mapping between the one or more packet data protocol contexts and the one or more bearers is performed, wherein the one or more packet data protocol contexts are used in the second network and the one or more bearers are first network bearers.

11. A method according to claim 1, wherein the second network comprises a second generation or third generation network, and wherein the first network comprises a long term evolution network.

12. The method according to claim 1, wherein the one-to-one mapping further comprises mapping a first packet data protocol context to a first radio bearer.

13. An apparatus, comprising:
a receiver configured to receive a handover initiation request for handover from a first network to a second network;
a one-to-one mapping unit configured to map between one or more packet data protocol contexts and one or more bearers; and
a transmitter configured to send a handover preparation request including a second network quality of service information from the apparatus to a target serving support node for further transmission to the second network, wherein the receiver is further configured to receive a handover preparation confirm message at the apparatus configured to indicate that a handover preparation phase is complete, and
the transmitter is further configured to send a handover command to a user equipment, the handover command including a second network information, wherein the second network information includes radio access bearer information, wherein when a connection is established between the user equipment and the second network, the user equipment is able to map ongoing services to correct packet data protocol contexts.

14. The apparatus according to claim 13, wherein the apparatus is configured to receive information, from the second network, that a handover is successful and is configured to update a user plane route with a user plane entity,
wherein resources, in a source access network, are released after the handover preparation confirm message is received by the apparatus.

15. The apparatus according to claim 13, wherein upon determining, by a network entity, that a handover is required from the first network to the second network, the receiver is configured to receive the handover initiation request.

16. The apparatus according to claim 13, wherein the transmitter is further configured to send the handover preparation request to the second network, and
the receiver is further configured to receive the handover preparation confirm message.

17. The apparatus according to claim 13, wherein the one-to-one mapping between the one or more packet data protocol contexts and the one or more bearers depends on at least one of a mapping of quality of service parameters in the first network and in the second network, one or more terminal capabilities, and a user profile.

18. The apparatus according to claim 13, wherein the apparatus is separated from a user plane entity and wherein the user plane entity is co-located with a third generation anchor.

19. The apparatus according to claim 18, wherein the apparatus requires subscriber tunnel identifiers for a tunneling protocol from the user plane entity, if the number of tunnels is different between the first network and the second network or if the apparatus is to indicate a quality of service for a new access.

20. The apparatus according to claim 19, further comprising an updating unit configured to update a user plane route between the user plane entity and the target serving support node for bi-casting purposes and configured to send the tunnel identifiers for a tunneling protocol from the target serving support node to the user plane entity.

21. The apparatus according to claim 13, wherein the one-to-one mapping further comprises mapping a first packet data protocol context to a first radio bearer.

22. An apparatus, comprising:
a receiver configured to receive a handover command from a source mobility management entity, wherein the handover command includes a second generation/third generation network radio access bearer, channel information, security information, and packet data protocol context information; and
a releasing unit configured to release a connection to a second generation/third generation network access system,
wherein when a connection to the second generation/third generation radio access network is established, the apparatus is configured to map an ongoing service one-to-one into an appropriate packet data protocol context.

23. A system, comprising:
a first transmitter in an evolved radio access network configured to send a handover initiation request for handover from a first network to a second network;
a receiver, in a source mobility management entity, configured to receive the handover initiation request for handover from the first network to the second network;
a performing unit, in the source mobility management entity, configured to map one-to-one between one or more packet data protocol contexts and one or more bearers, wherein the one or more packet data protocol contexts are used in a second generation/third generation network and the one or more bearers are system architecture evolution bearers;
a second transmitter, in the source mobility management entity, configured to send a handover preparation request including a second network quality of service information to a target serving support node for further transmission to the second network;

a setting unit configured to set up one or more radio access bearers according to the handover preparation request;

a third transmitter, in the second network access, configured to send a handover confirmation message to the source mobility management entity for indicating that a handover preparation phase is complete; and a fourth transmitter, in the source mobility management entity, configured to send a handover command to a user equipment, the handover command including a second network information, wherein the second network information includes radio access bearer information, wherein when a connection is established between the user equipment and the second network, the user equipment is able to map ongoing services.

24. A computer program embodied on a non-transitory computer readable medium, the computer program being configured to control a processor to perform operations comprising:

receiving, by a source mobility management entity, a handover initiation request for handover from a first network to a second network;

performing, by the source mobility management entity, a one-to-one mapping between one or more packet data protocol context and one or more bearers;

sending a handover preparation request including a second network quality of service information from the source mobility management entity to a target serving support node for further transmission to the second network;

receiving a handover preparation confirm message at the source mobility management entity for indicating that a handover preparation phase is complete; and sending, by the source mobility management entity, a handover command to a user equipment, the handover command including a second network information, wherein the second network information includes radio access bearer information, wherein when a connection is established between the user equipment and the second network, the user equipment is able to map ongoing services to correct packet data protocol contexts.

25. The computer program according to claim 24, further comprising:

receiving information, from the second network, by the source mobility management entity, that handover is successful;

updating a user plane route with a user plane entity; and releasing resources, in a source access network, after the handover preparation confirm message is received by the source mobility management entity.

26. The computer program according to claim 24, further comprising:

including a negotiated quality of service in the handover preparation confirm message.

27. The computer program according to claim 24, wherein the one-to-one mapping between the one or more packet data protocol contexts and the one or more bearers depends on at least one of a mapping of quality of service parameters in the first network and in the second network, one or more terminal capabilities, and a user profile.

* * * * *